July 6, 1965 E. A. MARHEINE 3,193,620
SUPERVISORY CONTROL CIRCUIT FOR MULTI-LINE TELEPHONE ANSWERING MACHINE
Filed June 15, 1962
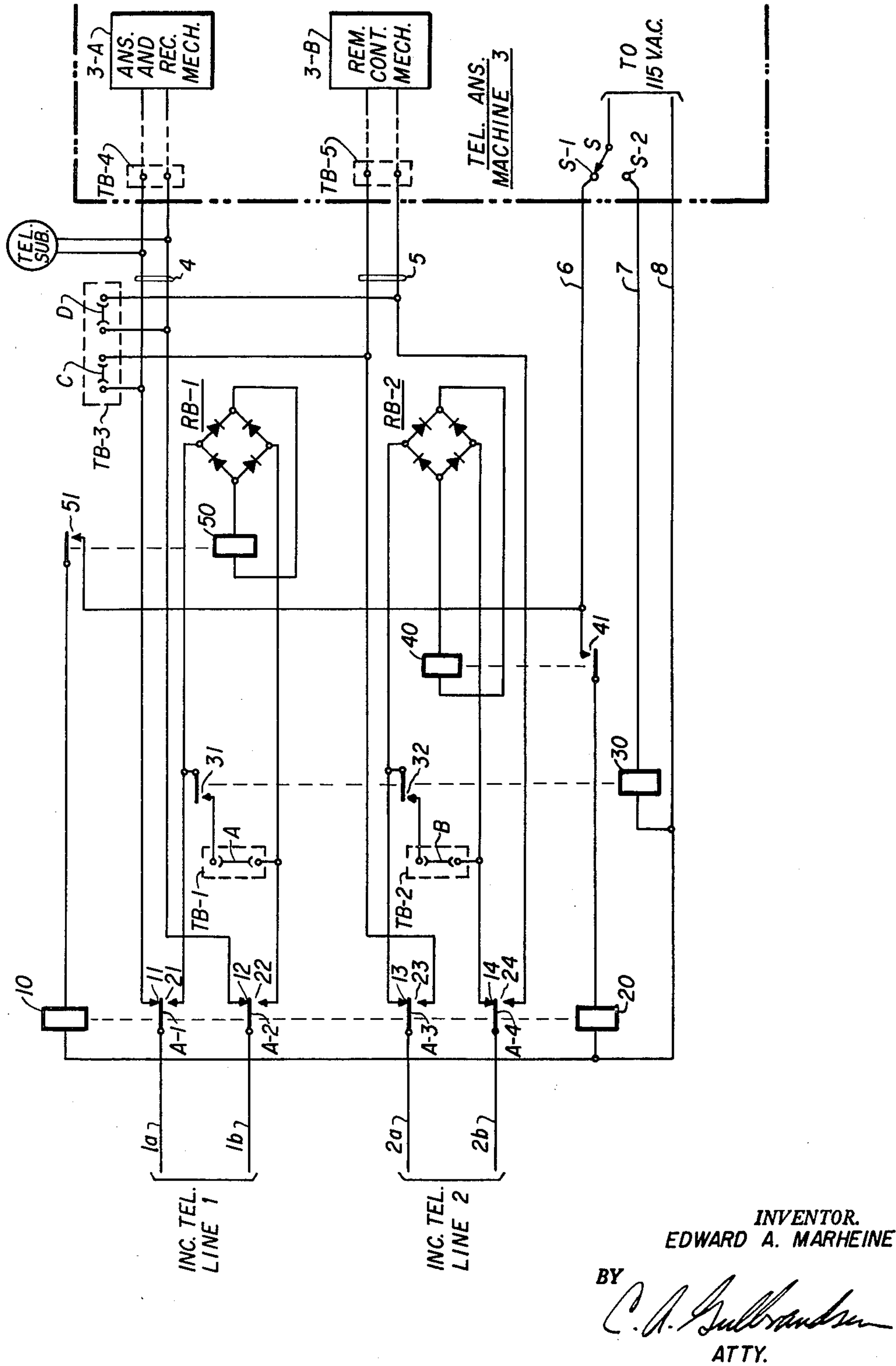
INVENTOR.
EDWARD A. MARHEINE
BY C. A. Gulbrandsen
ATTY.

United States Patent Office 3,193,620
Patented July 6, 1965

3,193,620
SUPERVISORY CONTROL CIRCUIT FOR MULTI-LINE TELEPHONE ANSWERING MACHINE

Edward A. Marheine, Milwaukee, Wis., assignor, by mesne assignments, to Automatic Electric Laboratories, Inc., Northlake, Ill., a corporation of Delaware Filed June 15, 1962, Ser. No. 202,871
1 Claim. (Cl. 179—6)

The present invention relates in general to control circuits for automatic telephone answering equipment of the type, which is directly connected to a telephone line for actuation in response to receipt of a ringing current thereover, and in particular to a control circuit arranged to provide selection and supervision for a plurality of separate telephone lines connected to a single telephone answering device.

The telephone answering equipment as called for in this specification may be defined as any of the equipment generally referred to as automatic answering devices including either an answer only machine which, answers an incoming call upon receipt of the ringing signal to transmit a pre-recorded message to the calling party and then disconnects itself from the line, or a combined answering and recording type of machine which is actuated upon receipt of a ringing signal to answer an incoming call to transmit a pre-recorded message to the calling telephone line and then records an incoming message received thereover.

It is pointed out that under certain service requirements, it has been found desirable to connect telephone answering equipment to more than one telephone line in order that calling connections may be extended thereto in response to the dialing of more than one call number. One of the reasons for this arrangement is to permit the extension of non-toll calls to the single answering machine, in cases where a business establishment has more than one incoming line and receives calls from a plurality of service areas. Another reason for having two telephone lines answered by a single answering machine is to provide a means of remote control whereby the subscriber can extend a call over a certain particular line which has an unlisted directory number, whereby the subscriber may change the outgoing message or play back messages which have been received and recorded in his absence.

It has also been found desirable to provide a supervisory control circuit arranged to function with the incoming telephone lines when two or more lines are connected to a single answering unit. Such a supervisory circuit permits the above-mentioned remote control of the answering machine over the second or unlisted line without interfering with the normal operation of the machine and prevents operation of the machine by more than one calling line at a time.

It is therefore a primary object of this invention to provide control means for a dually-connected telephone answering machine in order for the machine to answer incoming calls over either of two lines.

A feature of this invention relates to the provision of control apparatus for a dually-connected telephone answering machine, whereby the machine cannot be operated in response to an incoming call over the alternate line at any time that the machine is in its operating cycle.

A further feature of this invention relates to the provision of control apparatus for a dually-connected telephone answering machine, whereby an original calling party over one line is not disconnected from the machine in the event of receipt of a second call over the other line by another calling party.

Another feature of this invention relates to the provision of control apparatus for use with a dually-connected telephone answering machine, whereby receipt of an incoming call over one line provides operation of the machine in a normal answering and recording manner and receipt of an incoming call over the other line provides a remote control operation of the machine.

Still another feature of this invention relates to the provision of means, whereby the operation of placing a busy condition on the second line in response to receipt of an incoming call thereover is initiated, when a dually-connected telephone answering machine is in a cycle of operation in response to the answering of an incoming call over the first line.

The nature of the invention and its distinguishing features and advantages will be more clearly understood from the following detailed description when taken in conjunction with the accompanying drawing, which is a schematic circuit representation of the improved supervisory control circuit representing a practical application of this invention.

The supervisory control circuit of this invention as disclosed in the drawing comprises transfer apparatus adapted to be latched in either of two positions under the combined control of a cycle operation switch and one of two direct current relays. Each one of these two direct current relays are individual to a different one of the incoming lines, whereby the simultaneous operation of the cycle operation switch and one of the direct current relays completes a circuit for connecting the calling line associated therewith to the telephone answering machine if the machine is idle, or short circuits the line conductors if the telephone answering machine is in an operating cycle.

Referring in particular to the drawing, it will be seen that the answering machine 3 is provided with two terminal blocks TB–4 and TB–5, which terminate separate connections from the supervisory control circuit over pairs of conductors 4 and 5 respectively. It will be pointed out that internal connections from the terminal block TB–4 of the answering machine extend to the normal answering apparatus (not shown) therein, while the internal connections from terminal block TB–5 extend to the remote control apparatus (not shown) also contained therein.

Further, it will be seen that the first incoming telephone line 1, including the line conductors *1a* and *1b*, terminates in the supervisory control circuit by having the line conductors *1a* and *1b* connected to the latching armatures A1 and A2 respectively. The second incoming telephone line 2, including the line conductors *2a* and *2b*, also terminates in the supervisory control circuit by having the line conductors *2a* and *2b* connected to the latching armatures A3 and A4 respectively. The latching armatures A1 through A4 are mechanically ganged together in any suitable and well-known manner for controlled movement and latching thereof in either of two positions in response to the operation of either of the two alternating current latching, or transfer, relays 10 or 20. It is pointed out that the latching armatures A1 through A4 are not spring biased, but are first moved and then locked in one of the positions by the opertaion of the one of the latching relays and will remain in that position until they are moved to the other position by the operation of the other latching relay. The armatures A1 through A4 are shown in the drawing as being locked in their upper position due to a previous operatin of latching relay 10.

The upper latching relay 10 controls connections to the contacts 11, 12, 13 and 14, and the lower latching relay 20 controls connections to the contacts 21, 22, 23 and 24. The contacts 11 and 12 are connected by way of the pair of conductors 4 to terminal block TB–4, whereby a calling connection may be extended to the answer and record mechanism (not shown) of the answering set 3, while the contacts 23 and 24 are connected by way of the pair of conductors 5 to the terminal block TB–5, whereby a calling connection may be extended to the remote control mechanism (not shown) of the answering set 3.

The supervisory means individual to incoming telephone line 1 includes a rectifier bridge RB–1 connected in series with contacts 21 and 22 of the lower latching relay 20; a direct current relay 50 having normally open contacts 51 included in an incomplete alternating current operating circuit for the upper latching relay 10; and a "busy" relay 30 having a normally open contact 31 adapted to be closed to apply a low resistance circuit path across the contacts 21 and 22.

The supervisory means individual to the incoming telephone line 2 includes a rectifier bridge RB–2 connected in series with contacts 13 and 14 of the upper latching relay 10; a direct current relay 40 having normally open contacts 41 included in an incomplete alternating current operating circuit for the lower latching relay 20; and the "busy" relay 30 including a normally open contact 32 adapted to be closed to apply a low resistance circuit path across the contacts 13 and 14.

Operating current for the alternating current latching relays 10 and 20 in the supervisory control circuit is supplied from any suitable alternating current source through such as the switch S in the telephone answering machine 3. The armature of switch S normally connects one side of the alternating current source to conductor 6 through the stationary contact S–1. Upon normal actuation of the telephone answering machine, either by means of the answer and record or the remote control mechanisms (not shown), the armature of switch S is moved by any suitable means into contact with the second stationary contact S–2 to connect the one side of the alternaing current source to the conductor 7 to complete an obvious circuit to the "busy" relay 30.

The contacts 31 and 32 of "busy" relay 30 are respectively connected in series with terminal blocks TB–1 and TB–2, with the provision of respective straps A and B at each terminal block for connecting the two terminals of either terminal block together to complete the aforementioned short circuit for either of the lines 1 or 2. It will be appreciated however, that if the answering mechanism of machine 3 is arranged to answer one line, only the strap of the terminal block corresponding to the alternate line is connected across the terminal block terminals.

A third terminal block TB–3 provides connections with the two incoming lines, whereby either of which may terminate in the answer and record mechanism (not shown) of the answering machine, rather than having one specific line terminate in the remote control mechanism (not shown). This selection of connections is accomplished by the obvious expedient of straps C and D, which may be connected to the terminals of the terminal block TB–3 in a particular desired manner, thereby connecting the pair of conductors 5 with the pair of conductors 4 for termination in the answer and recording mechanism of the answering machine. However, if it is desired that the line corresponding to the pair of conductors 5 is to terminate only in the remote control mechanism, straps C and D are not connected to the terminals of terminal block TB–3.

Assuming that line 1 corresponds to a listed telephone number, whereby incoming calls are extended, as shown in the drawing, into the answering and recording mechanism 3A of the answering machine 3 for performing the normal functions of that of a telephone answering and recording machine, and that line 2 corresponds to an unlisted number known only to the subscriber, whereby the subscriber can call the unlisted number from a distant telephone and extend a connection over line 2 into the remote control mechanism 3B of the answering machine for control thereof to either play back previously recorded messages or to change the pre-recorded outgoing answer message.

With the locked, or stay-put type armatures A1 through A4 in the position such as shown in the drawing, an incoming call by way of line 1 is extended directly to the answer and recording mechanism 3A of the answering machine 3 over an obvious path including the pair of conductors 4 in an obvious manner. Ringing current as a result of the incoming call initiates the operation of the answering machine 3 to actuate the answering and recording mechanism 3A in a well-known manner, the operation of which is explained in detail in U.S. Patent No. 2,881,253 issued April 7, 1959 to E. A. Marheine. When the answering cycle is initiated in response to the call being extended from line 1 to the answering machine, the armature of switch S is moved from its normal position of engagement with contact S–1 into engagement with the other contact S–2 to complete an obvious operating and holding circuit for the alternating current relay 30. In actuating its contacts, relay 30 completes a low resistance circuit path at contacts 31 by way of strap A of terminal block TB–1 between the contacts 21 and 22, however since the armatures A1 and A2 are engaged with the contacts 11 and 12 of relay 10, this low resistance circuit has no effect on the operation of the apparatus for the time being. The actuation of contacts 32 completes a low resistance circuit path by way of strap B of terminal block TB–2 between the contacts 13 and 14 and therefore across the conductors of line 2 to effectively busy out that line, since the overall effect of the low resistance circuit is that of an "off-hook" condition on all incoming calls to line 2 for the time being and the calling party will thereafter get a busy signal in a manner well-known in the art.

After completion of the answering and recording cycle and the restoration of the answering machine to its normal standby condition, the armature of switch S is returned to the first contact S–1, thereby allowing relay 30 to release and remove the low resistance circuit short from across the line 2.

If an incoming call is extended into the supervisory control circuit by way of line 2 at the time that the answering machine is idle, ringing current is extended to the rectifier bridge RB–2 through the contacts 13 and 14, with this ringing current being rectified and extended to the direct current relay 40 to provide a momentary operating current therefor. The momentary operation of relay 40 closes its make contacts 41 to complete an operating circuit for the lower latching relay 20, from one side of the alternating current line, or source, over the contacts S–1, conductor 6, contacts 41, the winding of relay 20 and conductor 8 back to the other side of the alternating current line. The operation of relay 20 moves the "stay-put" armatures A–1 through A–4 into engagement with the contacts 21 through 24 and locks them in this position. The line conductors 2*a* and 2*b* of line 2 are now extended through contacts 23 and 24 to the remote control mechanism 3–B of the answering machine 3 over the pair of conductors 5. At the same time the line conductors of line 1 are disconnected from the answering and recording mechanism 3–A and transferred by way of contacts 21 and 22 to the ring responding circuit, which includes rectifier bridge RB–1 and the direct current relay 50. The initial operation of the remote control mechanism 3–B causes the armature of switch S to be moved once more from its normal position into engagement with contact S–2 to complete the previously mentioned circuit for operating the alternating current relay 30, thereby providing a low resistance circuit path such as previously described across the line 1 to simulate an "off-hook" condition, whereby on all incoming calls to line 1 for the time being, the calling party will subsequently receive a busy signal in a well-known manner.

The remote control mechanism 3–N restores to normal in response to the release of line 2 by the calling party, at which time the switch S also restores its armature to its normal condition of engagement with contacts S–1, thereby allowing relay 30 to release and open its contacts 31 and 32 to remove the previously mentioned low resistance circuit short from line 1. With the answering machine in the standby condition, incoming ringing current over line 1 is transmitted through contacts 21 and 22 to the rectifier bridge RB–1 to operate the direct current relay 50. The operation of relay 50 closes its contacts 51 to provide an operating path for the upper relay latching 10 from one side of the alternating current line by way of the armature S–1 of switch S, conductor 6, contacts 51, through the winding of relay 10 and over conductor 8 to the other side of the alternating current line. The operation of relay 10 returns the "stay-put" armatures A–1 through A–4 to their upper positions and into engagement with contacts 11 through 14, thereby extending the connection of line 1 through to the answering and recording mechanism 3–A and transferring the connection of line 2 from the remote control mechanism 3–B to the ring responding circuit, which includes the rectifier bridge RB–2 and the direct current relay 40.

If the subscriber does not desire to provide the means for causing the "off-hook" condition on the second line during the time that the answering machine is operating over the first line, the two straps A and B are disconnected from the terminals on the terminal blocks TB–1 and TB–2 respectively. In this arrangement, ringing current received over the second line (for example line 2 as shown in the drawing) will thus be extended to the rectifier bridge RB–2 and operate the selector relay 40 but will have no effect on the latching relay 20 as long as the answering machine 3 is not in its normal standby condition, because the operating circuit for relay 20 will be open at contacts S–1 of switch S during this period. If the calling party on line 2 chooses to maintain his connection, selector relay 40 will be operated by receipt of each intermittent application of ringing current. Upon the return of the answering machine 3 to its normal standby condition, receipt of the first application of ringing current will operate the latching relay 20 as described before to extend the calling connection over line 2 to the remote control mechanism 3–B and transfer line 1 to the ring responding circuit. Obviously similar operations will take place in response to receipt of an incoming call over line 1 during the time that the answering machine is operating in response to a previous incoming call over line 2.

If for a particular reason it is desired to provide answering and recording service for both lines 1 and 2 and not, for instance, provide line 2 with remote control service as shown, it is merely necessary to disconnect the connections to the terminal block TB–5 of the remote control mechanism 3–B and to connect straps C and D to their corresponding terminals on the terminal block TB–3. The selection and transfer operations on incoming calls over lines 1 and 2 will thereafter be exactly the same as described above, with the obvious exception that line 2 will be switched through to the answering and recording mechanism 3–A over the pair of conductors 4 rather than to the remote control mechanism 3–B.

Having described my invention and what is considered new and is desired to have protected by Letters Patent will be pointed out in the appended claim.

What is claimed is:

For use with a dually connected telephone answering set adapted to be initially actuated in response to receipt of telephone ringing current received over either a first or a second telephone line adapted for connection thereto, a supervisory switch-through device and circuit arrangement comprising: first control means operated in response to receipt of telephone ringing current received over said first line; second control means operated in response to receipt of telephone ringing current received over said second line; transfers means having a first position for connecting the first telephone line to said answering set and the second telephone line to said second control means, and a second position for connecting said first telephone line to said first control means and said second telephone line to said answering set; a first relay operated by said first control means to operate the said transfer means to said first position for the subsequent initial operation of said answering set by said telephone ringing current received over said first line; a second relay operated by said second control means to operate said transfer means to said second position for the subsequent initial operation of said answering set by said telephone ringing current received over said second line; and means controlled by an operation of said answering set disabling said first or said second control means in accordance with the operation of said second and said first relays, respectively.

References Cited by the Examiner

UNITED STATES PATENTS 2,677,018 4/54 Logan.
2,690,480 9/54 Logan.
2,740,846 4/56 Jacobs.
2,777,012 1/57 Logan ---------------- 179—6

IRVING L. SRAGOW, *Primary Examiner.*

BERNARD KONICK, *Examiner.*